United States Patent [19]

Meddaugh

[11] 4,273,813

[45] Jun. 16, 1981

[54] METHOD OF PROVIDING WATERPROOF COATING FOR MASONRY WALLS

[75] Inventor: Michael D. Meddaugh, Midland, Mich.

[73] Assignee: Dow Corning Corporation, Midland, Mich.

[21] Appl. No.: 150,867

[22] Filed: May 19, 1980

[51] Int. Cl.³ ............................................... B05D 3/02
[52] U.S. Cl. ...................................... 427/387; 52/515; 260/29.2 M; 427/393.6; 427/421; 427/428; 427/429
[58] Field of Search ...................... 427/387, 429, 393.6, 427/421, 428; 260/29.2 M; 428/447, 911; 52/515; 106/2, 33; 528/18

[56] References Cited

U.S. PATENT DOCUMENTS

| | | | |
|---|---|---|---|
| 2,881,146 | 4/1959 | Remer | 260/29.2 M |
| 2,891,920 | 6/1959 | Hyde et al. | 260/29.2 M |
| 3,294,725 | 12/1966 | Findlay et al. | 260/29.2 M |
| 3,355,406 | 11/1967 | Cekada, Jr. | 260/29.2 M |
| 3,696,127 | 10/1972 | Matherly | 260/29.2 M X |
| 4,170,690 | 10/1979 | Armbruster et al. | 427/393.6 X |
| 4,209,432 | 6/1980 | Roth | 260/29.2 M |
| 4,221,688 | 9/1980 | Johnson et al. | 260/29.2 M X |

FOREIGN PATENT DOCUMENTS 848352  9/1960  United Kingdom .

OTHER PUBLICATIONS

"Sodium Methylsiliconate; Nature and Applications," Kather and Torkelson, Ind. Eng. Chem. 46 281–384 (1954).

"Production and Kind of Action of Molecular Silicon Films of Materials of a Silicate Nature," Noll and Weisbach, Zement-Kalk-Gips 9, 476–486 (1956).

*Primary Examiner*—Ronald H. Smith
*Assistant Examiner*—Thurman K. Page
*Attorney, Agent, or Firm*—Roger H. Borrousch; Edward C. Elliott

[57] ABSTRACT

A simplified method of waterproofing masonry walls such as basement walls subjected to water from the outer surface by coating the inner surface with an anionic silicone emulsion that dries to produce an elastomeric film is disclosed. The silicone emulsion consists essentially of an anionically stabilized hydroxyl endblocked polydiorganosiloxane, amorphous silica, and an organic tin salt, the emulsion having a pH of 9 or greater.

The emulsion coating when dried provides an elastomeric film that bonds to the surface with sufficient force to resist the pressure of any water that may diffuse through the wall from the outer surface. The method of this invention provides a waterproof coating that also resists the effects of cracks in the substrate, temperature extremes, molds, fungus, or mildew, as well as possessing a long useful life.

6 Claims, No Drawings

METHOD OF PROVIDING WATERPROOF COATING FOR MASONRY WALLS

BACKGROUND OF THE INVENTION

1. Field of the Invention

This invention relates to a method of waterproofing masonry walls by coating the inner surface with a one-package silicone elastomeric emulsion.

2. Description of the Prior Art

Materials, including certain silicone materials, have been applied to masonry walls to retard the absorption of water during rainstorms. These materials are useful because they meet the requirement for producing a treated surface which repels rain water running over its surface. Such water produces little pressure other than what might be provided by the wind. Many references refer to waterproofing walls when they are really referring to such a water repellent application.

Silicone materials used for such water repellent applications are not suitable for applications where the water is under a hydrostatic pressure, such as in a swimming pool or on a basement wall where there is a possibility of water resting against the wall and exerting a pressure differential between the inside and outside of the wall.

Kather and Torkelson in "Industrial and Engineering Chemistry," 46, 381–4 (1954), teach that silicones applied to concrete blocks are ineffective for waterproofing. In order to successfully waterproof a basement wall on the inner surface, they teach coating the blocks with two coats of cement paint, then coating the painted blocks with a 2 percent solution of sodium metasilicate. This treatment gave a waterproof surface which withstood a 4 foot head of water except for pinholes in the application. The pinholes had to be plugged to yield a useful waterproof surface. Similar results were obtained by adding sodium metasilicate to the cement paint before it was applied.

Hurst in British Pat. No. 848,352 teaches that walls, such as in basements, can be waterproofed by applying a coating comprising a mixture of water-soluble siliconate and a dispersion or emulsion of rubber latex in a cement, mortar, or plaster mix. His Example 3 shows such a mixture which he states can be applied to the inner surface of a wall by trowel or when diluted by a cement spraying machine. He gives no indication of the effectiveness of such a surface application.

Noll and Weisbach in an article on "Production and kind of action of molecular silicone films on materials of a silicate nature," Zement-Kalk-Gips 9, 476–86 (1956): CA 51, 9120c teach that emulsions are not a suitable treatment for waterproofing masonry because they do not penetrate as do solvent solutions.

SUMMARY OF THE INVENTION

A simplified method of waterproofing masonry walls by coating the inner surface with a silicone emulsion that cures to an elastomeric film on drying is described. The cured elastomeric film bonds to the surface of the wall with sufficient force to resist the penetration through the wall of water coming through the wall from the outside. The bond of the film to the masonry surface resists the effects of water so that the film does not lose adhesion on protracted exposure to water, even when the water is under pressure.

It is an object of this invention to provide a method of waterproofing masonry walls, such as in a basement, by coating the inner surface of the wall with a silicone emulsion and drying the emulsion to provide an elastomeric film bonded to the wall with sufficient force to resist the effects of water under pressure that may penetrate the wall from the outer surface.

It is an object of this invention to provide a method of waterproofing masonry walls by coating the inner surface with a one-part silicone emulsion.

DESCRIPTION OF THE INVENTION

This invention relates to a method of waterproofing a masonry wall to prevent liquid water from passing through the wall, said masonry wall having at least two surfaces, an inner surface and an outer surface, said outer surface being in a location which allows exposure to hydrostatic pressure from ground and surface liquid water, said method comprising (I) coating said inner surface with an elastomeric silicone emulsion consisting essentially of 100 parts by weight of an anionically stabilized, hydroxyl endblocked polydiorganosiloxane in the form of an aqueous emulsion, greater than 1 part by weight of amorphous silica, and an organic tin salt, the elastomeric silicone emulsion having a pH of 9 or greater and having a solids content of greater than 35 percent by weight, and (II) drying the elastomeric silicone emulsion coated inner surface.

The treatment of masonry walls to prevent the passage of water through them has been a long-standing problem. Walls above the ground are now commonly treated on the surface exposed to the weather with silicone resin or siliconate materials to create a water repellent surface so that the wind-driven rain does not penetrate, but runs off. Such a treatment is not satisfactory for use below ground where water can saturate the ground and create a pressure, forcing the water through the walls. Underground walls are commonly treated during construction by coating the outer surface of the wall with a bituminous coating, a plastic film, or organic insulations such as polyurethane foam or polystyrene foam. Such treatments are successful as long as they are properly applied and are not damaged during the backfilling operation when the ground is placed against the outer surface of the wall. Outer wall treatments also fail due to changes in the coating during their intended useful life. The organic coatings can become brittle due to aging effects and attack by organisms in the soil. Once they are brittle, the shifting of the wall, due to settling and/or freeze-thaw cycles, can crack the coating, causing a failure point through which water can penetrate. The water then diffuses throughout the wall and eventually comes through the inner surface. The diffusion makes it extremely difficult to locate the source of leaks as the position of the leak on the inside of the wall does not necessarily indicate the location of the failure of the coating on the outside of the wall.

Once construction is completed it is difficult and expensive to repair the waterproof coating on the outer wall surface as the earth must be excavated to expose the coating for repair. The excavating can also cause more damage to the coating. For this reason, it is preferable to try to seal the wall from the inside. The wall itself could still become saturated with water, but a successful coating on the inner surface would prevent the water from coming into the basement itself. Present methods of attempting to provide such a waterproof coating on the inner surface normally consist of coating the wall with a cement based coating. The cement based coating may also contain other ingredients to help make the cement coating waterproof such as organic resins, rubber latex, or silicone resin or siliconate water repellents. The cement paints suitable as a one-part coating are in solvent solutions. The wall must be dry in order to apply them. After they are applied and dried, the wall must then be subjected to moisture in order to hydrolyze the cement and cause it to cure and bond properly to the wall. It is not uncommon for walls treated with cement coatings to leak during the first exposure to moisture after application.

It has also been suggested that walls can be waterproofed by coating the wall with two coats of cement to fill all the voids present in the wall surface, then making the coating waterproof by treating the dried and cured cement coating with a silicate such as sodium methylsilicate.

The method of the instant invention for waterproofing masonry walls is much simpler than previously known methods. The silicone emulsion used in the method of the instant invention is a one-part system, completely mixed and ready to apply as received by the user. The method of the instant invention calls for the coating of the surface of a masonry wall using the silicone emulsion specified. The wall surface to be coated can be any type of masonry wall such as those constructed of poured concrete, concrete blocks, bricks, or stone bonded together with mortar. Other than removing loose particles, no pretreatment is necessary. The emulsion can be applied to walls which are damp at the time of application as long as water is not flowing which would wash the emulsion away. The emulsion is applied to the surface such as by brushing, rolling or spraying to completely cover the surface with a film sufficiently thick to yield a continuous film when dried. Particularly useful coating amounts are in the range of between 1.8 $m^2$ of surface to 3.7 $m^2$ of surface for each liter of emulsion used. The coating is then cured by drying to remove the water. When the water is removed, the coating is a cured elastomeric film bonded to the substrate. The water can be removed at ambient temperature and a cured film will result. It is desirable to apply and cure a second coat to assure that no minor pinholes in the first coat remain. The final thickness of the cured coats should be at least in the range of about 0.5 mm to insure the most useful results. After the emulsion is applied, the surface, at least, does have to dry to allow the emulsion coating to properly cure and bond to the wall surface. The emulsion used as in this method will successfully seal walls constructed of concrete blocks without precoating the blocks with cement or cement paint to fill the large voids often present in the blocks as manufactured.

The coating of the surface of the masonry wall is preferably done in at least two applications, drying each coat before applying the next. By this method, any possible flaw in one coat would be covered by the next coat, thus insuring a final coat free of voids. Each coat should be applied to completely cover the exposed surface of the wall thus producing a continuous film over the entire surface when the emulsion is cured by drying. The thixotropic flow characteristics that can be given to the emulsions used in the method of this invention make it simple to obtain such a complete coating even on rough surfaces such as concrete blocks.

After coating the surface of the wall with a continuous film of the emulsion, the emulsion is cured by evaporation of the water. The dried film forms a continuous film, firmly bonded to the substrate. It was completely unexpected that a silicone emulsion could be applied to a masonry wall, be cured by simple drying and bond with sufficient force to resist water pressure applied in such a manner as to tend to force the cured film away from the surface. Coatings are available that seal a surface when applied on the same surface as is exposed to the water, such as in a swimming pool, but the inventor knows of no such coatings that will resist water pressure that tends to remove the coating from the surface.

The method of the instant invention yields unexpected advantages over previous methods of waterproofing walls. The unexpected bond of the cured emulsion to the wall sufficient to resist water under pressure had already been noted above. It has also been found that a coated block can subsequently crack as is common with such walls and the film will not be ruptured, but will stretch sufficiently to maintain a continuous film over the crack. Test blocks coated with sufficient emulsion to yield a dry film of approximately 0.5 mm thickness could be separated up to 3 mm without the film failing. This was true when the blocks were cracked both at an elevated temperature of 70° C. and a low temperature of −50° C. This ability to maintain film integrity over a wide temperature range even when the substrate fails is unique among known methods of waterproofing masonry walls.

The method of this invention provides a waterproof coating with a long expected life. As discussed above and as shown in the Example, the coating resists the effect of water present at the bond between the film and the substrate. The coating can withstand cracks in the substrate. The coating retains its useful properties at both elevated temperatures such as 70° C. and at low temperatures such as −50° C. The coating also resists the effects to mildew, mold, and fungus sometimes found in damp locations. A basement wall already containing mildew was experimentally coated according to the method of this invention. The characteristic odor of mildew was no longer apparent after the wall was coated, nor has it returned in the time since the wall was coated. The coating achieved by the method of this invention also resists the effects of bacteria, molds, and fungus in contrast to organic based coatings which often support such growths.

The method of this invention comprises coating the inner surface of a masonry wall with a silicone emulsion and drying the silicone emulsion coated inner surface. A preferred silicone emulsion useful in this invention consists essentially of 100 parts by weight of an anionically stabilized, hydroxyl endblocked polydiorganosiloxane, present as an oil-in-water aqueous emulsion, greater than 1 part of amorphous silica, and from 0.1 to 1.5 parts by weight of alkyl tin salt, said emulsion having a pH of 9 or greater. Emulsions useful in the method of this invention and methods for producing them are disclosed by Johnson, Saam, and Schmidt in U.S. patent application "A Silicone Emulsion Which Provides an Elastomeric Product and Methods for Preparation," Ser. No. 901,052, filed Apr. 28, 1978 and now U.S. Pat. No. 4,221,668, assigned to the same assignee as the instant application, which is hereby incorporated by reference to show such emulsions and their methods of preparations.

A preferred elastomeric silicone emulsion useful in the method of this invention has a solids content of from 35 percent to 75 percent by weight. For purposes of this invention, the solids content is defined as the nonvolatile content of an emulsion. The nonvolatile content is determined by placing 2 g of emulsion in an aluminum weighing dish of 50 mm diameter and heating in an air circulating oven for 1 hour at 150° C. After cooling, the percent of the original 2 g remaining is determined. This residue represents the percent solids present in the original emulsion. Solids contents lower than 35 percent by weight require multiple coats applied to the inner wall in order to build up a sufficient final coating thickness. Applying a multitude of coats is an unnecessary expense. Solids contents greater than 75 percent by weight are possible, but the viscosity of the emulsion is so high that the application of the emulsion to the wall becomes difficult. The most preferred solids contents of from 45 percent to 60 percent by weight are particularly useful.

The dispersed phases of the silicone emulsion used in the method of this invention requires anionically stabilized hydroxyl endblocked polydiorganosiloxane in emulsion and amorphous silica. The preferred method for preparing the polydiorganosiloxane is by emulsion polymerization as described in U.S. Pat. No. 3,294,725 by Findlay et al. which is hereby incorporated to show such emulsions and their preparation. The preferred weight average molecular weight of the polydiorganosiloxane is in the range of 200,000 to 700,000. Such polymers yield desirable combinations of tensile strength and elongation at break. The preferred polydiorganosiloxane is polydimethylsiloxane.

Amorphous silica is required in the emulsion used in this invention. Any of the finely divided amorphous silicas can be used. The preferred amorphous silica for use in the emulsion used in this invention is a colloidal silica in an aqueous medium. Such aqueous dispersions of colloidal silica are commercially available in a stabilized form, such as aqueous colloidal silicas which have been stabilized with sodium ion. The preferred amount of colloidal silica is from 2 to 50 parts by weight based on 100 parts by weight of the hydroxyl endblocked polydiorganosiloxane. The amount of colloidal silica used depends to some extent upon the particle size or surface area of the silica. More silica can be used when the silica has a surface area such as 250 $m^2/g$ to 500 $m^2/g$ than when the colloidal silica has a high surface area such as 750 $m^2/g$. Particularly preferred is a colloidal silica having a surface area of greater than 500 $m^2/g$ in an amount of from 2 to 25 parts by weight. The use of such a colloidal silica is believed to result in superior bonding of the cured coating to the substrate.

Emulsions can be prepared containing only the polydiorganosiloxane and amorphous silica. Such emulsions do not provide useful films upon drying. It has been found that the addition of an organic tin salt, preferably a dialkyltindicarboxylate, is necessary for the preparation of silicone emulsions which yield useful films upon drying. An elastomeric product can be obtained by removal of the water from the emulsion in one to three days after its preparation. The preferred diorganotindicarboxylates are dibutyltindiacetate, dibutyltindilaurate, and dioctyltindilaurate. The most preferred is dioctyltindilaurate.

The silicone emulsion used in the method of this invention can also contain other useful ingredients. The long term storage stability of the emulsion is improved by the addition of an organic amine. Useful organic amines include diethylamine, ethylenediamine, butylamine, hexylamine, morpholine, monoethanolamine, triethylamine, and triethanolamine. The preferred amine is diethylamine. The viscosity and thixotropic nature of the emulsion can be regulated by the addition of suitable commercial thickeners. Such useful thickeners include the classes of cellulose derivatives, alkali salts of polyacrylates and polymethacrylates, sodium and ammonium salts of carboxylate copolymers, and colloidal clays. The preferred thickeners are the sodium salts of polyacrylates. An antifoaming agent such as the commercially available silicone based materials may be added to control foaming, particularly during the manufacture of the emulsion. Additional semi-reinforcing and extending fillers such as diatomaceous earth, finely ground silica, and alkaline clays can be added in amounts up to 50 parts by weight based on 100 parts of hydroxyl endblocked polydiorganosiloxane. The common pigments can also be added. All additives selected should be compatible with the emulsion at a pH of 9 or greater.

A commercially available acrylic resin based aqueous emulsion tradenamed "DIATHON" (United Paint Manufacturing Inc., Spokane, Wash.) offered for usefulness as a waterproof coating for basement walls was evaluated as a control for comparative purposes.

The "DIATHON" was applied to a concrete block prepared as in the Example below in two coats and allowed to dry for 3 days. The core of the coatd block was filled with water and the block allowed to sit for 7 days. After the first day the coating showed a few small blisters. After the 7 day period, the block filled with water was pressurized as explained in the Example below. The coating immediately formed many blisters, some as much as 25 mm in diameter and the water leaked through the coating.

The following example is included for illustrative purposes only and should not be construed as limiting the invention which is properly delineated by the appended claims. All parts are parts and percents by weight.

EXAMPLE

The suitability of the method of this invention for waterproofing walls under hydrostatic pressure was determined.

An elastomeric silicone emulsion was prepared by mixing together approximately 55 parts of an anionically stabilized, hydroxyl endblocked polydimethylsiloxane present as a 58 percent solids aqueous emulsion, 32 parts of a 15 percent solids aqueous colloidal silica dispersion, the silica having 750 $m^2$ surface area per gram, 8 parts of finely divided titanium dioxide, 0.6 part of diethylamine, 0.3 part of a 50 percent emulsion of dioctyltindilaurate, 3.2 parts of acrylic thickening agent, and 0.9 part of pigment, antifoam agent and freeze-thaw stabilizer to complete the mixture. The emulsion had about 48 percent solids and a pH of about 10.5.

A standard commercial concrete block was modified for use as a test device. The block was a 200 mm cube with a single square hole or core passing through the block from top to bottom forming walls of approximately 4 cm thickness. The core was first plugged on the bottom with concrete to create a concrete container open on the top. The 4 sides and plugged bottom of the block were brush coated with the above emulsion applied in an amount of 2.1 $m^2$ of surface coated per liter of emulsion used, and dried for 24 hours. A second coat was then applied in an amount of 3 $m^2$ of surface coated per liter of emulsion used, and dried for 24 hours.

The coated block was then tested in accordance with the procedure of paragraph 4.3.8 of Federal Specification TT-P-1411A dated Nov. 15, 1973 for testing cementitious copolymer-resin paints for waterproofing concrete and masonry walls, except that the specification seals the core of the block on top and bottom with a gasketed plate so that 4 sides are under test. The procedure used here tests 4 sides and the plugged bottom. The core of the block was filled with water and kept full for 7 days. There were no leaks or blisters caused by failure of the emulsion film adhesion to the block under the pressure of the water. The block was then placed in a fixture and a pressure of 27.5 kPa (equivalent to a water head of 3 meters) was applied to the water filled block for 30 minutes. No leaks or blisters appeared. The apparatus was left full of water for 24 hours, then the pressure was again applied for 30 minutes. Again there were no leaks or blisters.

That which is claimed is:

1. A method of waterproofing a masonry wall to prevent liquid water from passing through the wall, said masonry wall having at least two surfaces, an inner surface and an outer surface, said outer surface being in a location which allows exposure to hydrostatic pressure from ground and surface liquid water, said method comprising
   (I) coating said inner surface with an elastomeric silicone emulsion consisting essentially of 100 parts by weight of an anionically stabilized, hydroxyl endblocked polydiorganosiloxane in the form of an aqueous emulsion, greater than 1 part by weight of amorphous silica, and an organic tin salt, the elastomeric silicone emulsion having a pH of 9 or greater and having a solids content of greater than 35 percent by weight and
   (II) drying the elastomeric silicone emulsion coated inner surface.

2. The method of claim 1 in which the inner surface of the masonry wall is coated with a first coat of elastomeric silicone emulsion covering a surface area between 1.8 $m^2$ and 3.7 $m^2$ for each liter of elastomeric silicone emulsion; the coating is dried; a second coat of elastomeric silicone emulsion is coated over the first coat providing coverage in the same range as the first coat, and the second coat is dried to yield a continuous coating free of pinholes.

3. The method of claim 1 in which the elastomeric silicone emulsion has a solids content of from 35 percent to 75 percent by weight, the amorphous silica is a colloidal silica in an amount from 2 to 50 parts by weight, and the organic tin salt is a dialkyltindicarboxylate.

4. The method of claim 1 in which the dried coat of elastomeric silicone emulsion is at least 0.5 mm in thickness.

5. The method of claim 3 in which the elastomeric silicone emulsion has a solids content of from 45 percent to 60 percent by weight, the colloidal silica has a surface area of greater than 500 $m^2/g$ and is in an amount of from 2 to 25 parts by weight, up to 50 parts of filler, other than amorphous silica, is also present, and the dialkyltindicarboxylate is selected from the group consisting of dibutyltindiacetate, dibutyltindilaurate, and dioctyltindilaurate.

6. The method of claim 3 in which the hydroxyl endblocked polydiorganosiloxane is polydimethylsiloxane.

* * * * *